US011862869B2

(12) United States Patent
Zhang et al.

(10) Patent No.: US 11,862,869 B2
(45) Date of Patent: Jan. 2, 2024

(54) ANTENNA STRUCTURE

(71) Applicant: QuantumZ Inc., Kaohsiung (TW)

(72) Inventors: Gang-Lin Zhang, Kaohsiung (TW); Meng-Hua Tsai, Tainan (TW); Weiting Lee, Kaohsiung (TW); Sin-Siang Wang, Kaohsiung (TW)

(73) Assignee: QuantumZ Inc., Kaohsiung (TW)

( * ) Notice: Subject to any disclaimer, the term of this patent is extended or adjusted under 35 U.S.C. 154(b) by 112 days.

(21) Appl. No.: 17/805,866

(22) Filed: Jun. 8, 2022

(65) Prior Publication Data

US 2023/0054657 A1 Feb. 23, 2023

(30) Foreign Application Priority Data

Aug. 19, 2021 (TW) ................................ 110130738

(51) Int. Cl.

*H01Q 5/45* (2015.01)
*H01Q 11/14* (2006.01)
*H01Q 5/328* (2015.01)

(52) U.S. Cl.

CPC ............... *H01Q 5/45* (2015.01); *H01Q 5/328* (2015.01); *H01Q 11/14* (2013.01)

(58) Field of Classification Search

CPC ........ H01Q 5/45; H01Q 5/328; H01Q 15/242; H01Q 15/148; H01Q 15/0086; H01Q 15/008; H01Q 9/30; H01Q 5/357; H01Q 9/46

See application file for complete search history.

(56) References Cited

U.S. PATENT DOCUMENTS 6,262,495 B1 * 7/2001 Yablonovitch ....... H01Q 15/008 307/101
6,426,722 B1 * 7/2002 Sievenpiper ........... H01Q 15/10 343/909
7,046,198 B2 * 5/2006 Sakiyama ............ H01Q 15/002 343/824
7,612,632 B2 * 11/2009 Tanaka .................. H01P 1/2005 333/26

(Continued)

FOREIGN PATENT DOCUMENTS

CN 112670322 B * 10/2022
WO WO-2020149138 A1 * 7/2020 ............... H01Q 1/48

*Primary Examiner* — Dimary S Lopez Cruz
*Assistant Examiner* — Jordan E. DeWitt
(74) *Attorney, Agent, or Firm* — CKC & Partners Co., LLC

(57) ABSTRACT

An antenna structure includes a substrate, a plurality of reflective plates, a grounding plate, a radiating member and a plurality of conductive vias. The substrate contains liquid crystal polymer and has opposite first and second surfaces. The reflective plates are arranged in an array on the first surface of the substrate. The grounding plate is arranged on the second surface of the substrate and overlaps with the reflective plates in a normal direction of the substrate. The radiating member is on the second surface of the substrate and does not overlap with the reflective plates in the normal direction of the substrate. The radiating member has an open slot which is defined by a first radiating branch and a second radiating branch that generate at least two different operating frequency bands. The conductive vias respectively penetrate the substrate and connect with the reflective plates and the grounding plate.

12 Claims, 13 Drawing Sheets

(56) References Cited

U.S. PATENT DOCUMENTS

| | | | | |
|---|---|---|---|---|
| 7,855,689 | B2 * | 12/2010 | Fukui | H01Q 21/068 343/846 |
| 7,994,984 | B2 * | 8/2011 | Inoue | H01Q 9/42 343/909 |
| 8,188,928 | B2 * | 5/2012 | Lin | H01Q 15/008 343/909 |
| 8,873,246 | B2 * | 10/2014 | Toyao | H05K 1/0298 361/748 |
| 9,136,609 | B2 * | 9/2015 | Ando | H01Q 9/0407 |
| 9,386,688 | B2 * | 7/2016 | MacDonald | H01Q 9/0407 |
| 9,450,311 | B2 * | 9/2016 | Ng | H01Q 15/24 |
| 10,777,882 | B2 * | 9/2020 | Cho | H01Q 1/52 |
| 2005/0068233 | A1 * | 3/2005 | Tanaka | H01Q 15/008 343/729 |
| 2019/0006751 | A1 * | 1/2019 | Chen | H04B 7/10 |
| 2019/0190120 | A1 * | 6/2019 | Kim | H01Q 21/065 |
| 2019/0305432 | A1 * | 10/2019 | Kim | H01Q 21/0025 |
| 2020/0091594 | A1 * | 3/2020 | Lin | H01Q 1/36 |
| 2020/0176877 | A1 * | 6/2020 | Kim | H01Q 21/24 |
| 2020/0358202 | A1 * | 11/2020 | Yun | H01Q 21/06 |
| 2021/0028551 | A1 * | 1/2021 | Sakurai | H01Q 1/528 |
| 2022/0077596 | A1 * | 3/2022 | Xi | H01Q 1/38 |

* cited by examiner

ANTENNA STRUCTURE

RELATED APPLICATION

This application claims priority to Taiwan Application Serial Number 110130738, filed Aug. 19, 2021, which is herein incorporated by reference in its entirety.

BACKGROUND

Field of the Invention

The disclosure relates to an antenna structure, more particularly to an antenna structure with a reflective plate array.

Description of Related Art

With the vigorous development of communication technologies, commercial mobile communication systems have achieved high-speed data transmissions and enabled network service providers to offer various services such as video streaming, real-time traffic report, driving navigation, internet communications and other network services that require large amount of data transmission. In terms of hardware, the antenna design affects the performance of wireless signals transmission and reception. Therefore, an antenna structure that has a wide frequency band as well as good radiation efficiency and antenna gain has become one of the major pursuits in the industries.

SUMMARY

One aspect of the disclosure directs to an antenna structure which includes a substrate, reflective plates, a first grounding plate, a first radiating member and conductive vias. The substrate has opposite first and second sides and contains liquid crystal polymer material. The reflective plates are on the first surface of the substrate and arranged in an array. The first grounding plate is on the second surface of the substrate and overlapped with the reflective plates in the normal direction of the substrate. The first radiating member is on the second surface of the substrate and does not overlap with the reflective plates in the normal direction of the substrate. The first radiating member has an open slot defined by a first radiating branch and a second radiating branch that generate at least two different frequency bands, wherein the length of the first radiating branch is ranged from $0.23\lambda_1$ to $0.25\lambda_1$ and the length of the second radiating branch is ranged from $0.23\lambda_2$ to $0.25\lambda_2$, where $\lambda 1$ and $\lambda_2$ are wavelengths of the first resonance frequency and the second resonance frequency respectively corresponding to the two operating frequency bands. The conductive vias penetrate through the substrate and respectively connect the reflective plates on the first surface and the first grounding plate on the second surface of the substrate.

In one embodiment, the first grounding plate defines an opening, and a signal feeding terminal of the first radiating member is located in the opening.

In one embodiment, the substrate has a planar portion and a protrusive portion substantially perpendicular to each other. The reflective plates and the first radiating member are respectively in the planar portion and the protrusive portion.

In one embodiment, the open slot is L-shaped.

In one embodiment, the first radiating member includes a signal feeding terminal, a signal feeding branch and at least two radiating branches. The signal feeding terminal is configured to couple to an external terminal. The signal feeding branch is coupled to the signal feeding terminal. The radiating branches are coupled to the signal feeding branch and define the open slot.

In one embodiment, the radiating branch is square-shaped or rectangular-shaped.

In one embodiment, the antenna structure further includes a second grounding plate and a second radiating member. The second grounding plate is on the first surface of the substrate and electrically connects to the first grounding plate. The second radiating member is on the first surface of the substrate and connects to the second grounding plate. The second radiating member and the first radiating member constitute a dipole antenna.

In one embodiment, a signal feeding branch of the first radiating member and a signal feeding branch of the second radiating member are overlapped in the normal direction of the substrate.

In one embodiment, the first radiating member includes a signal feeding terminal, a signal feeding branch and at least two radiating branches. The signal feeding terminal is configured to couple to an external terminal. The signal feeding branch is coupled to the signal feeding terminal. The radiating branches are coupled to the signal feeding branch and define the open slot.

In one embodiment, the second radiating member further includes a grounding branch coupled to the second grounding plate.

In one embodiment, the first radiating member includes a signal feeding terminal, a signal feeding branch, a grounding branch and at least two radiating branches. The signal feeding terminal is configured to couple to an external terminal. The signal feeding branch is coupled to the signal feeding terminal. The grounding branch is coupled to the first grounding plate. The radiating branches are coupled to the signal feeding branch and the grounding branch and define the open slot.

In one embodiment, the reflective plates are rectangular-shaped, cross-shaped or circular-shaped.

BRIEF DESCRIPTION OF THE DRAWINGS

The foregoing aspects and many of the accompanying advantages of this disclosure will become more readily appreciated as the same becomes better understood by reference to the following detailed description, when taken in conjunction with the accompanying drawings.

DETAILED DESCRIPTION

The detailed explanation of the disclosure is described as following. The described embodiments are presented for purposes of illustrations and description, and are not intended to limit the scope of the disclosure.

Terms are used only to describe the specific embodiments, and not to limit the claims appended herewith. Unless otherwise specified, the term "a," "an," "one" or "the" of the singular form may also represent the plural form.

In the following description and claims, the term "coupled" along with their derivatives, may be used. In some embodiments, "coupled" may be used to indicate that two or more elements are in direct physical or electrical contact with each other, or may also mean that two or more elements may not be in direct contact with each other.

In this disclosure, each radiating member is a quarter-wavelength resonant monopole antenna. In addition, each radiating member further has an open slot, and the current may be branched into different paths to generate at least two different frequency bands. That is, the radiating member is capable of multiple frequency bands. The reflective plate array and the grounding plate are grounded jointly to avoid the surface wave effect caused by the voltage difference of different groundings. The substrate, the reflective plates arrayed on the first surface of the substrate, and the grounding plate on the second surface of the substrate form a meta-material structure with a negative refractive index. This meta-material exhibits left-hand characteristics different from the right-hand characteristics. Therefore, the meta-material structure may combine with the radiating member having right-handed characteristics to enable the overall antenna exhibiting combined left and right characteristics, thereby increase the operating bandwidth. In addition, parasitic capacitors generated between two adjacent reflective plates, together with inductive properties of the reflective plates, form a parallel LC circuit. The arrayed reflector plates have an infinite impedance at a resonance frequency and are capable of reflecting electromagnetic waves back to the radiating member. An effect similar to a notch filter is also achieved, such that the overall radiation pattern is directed to the top of the reflective plate array, and hence the antenna gain and the directivity of the antenna structure are further improved.

Figure 1B:
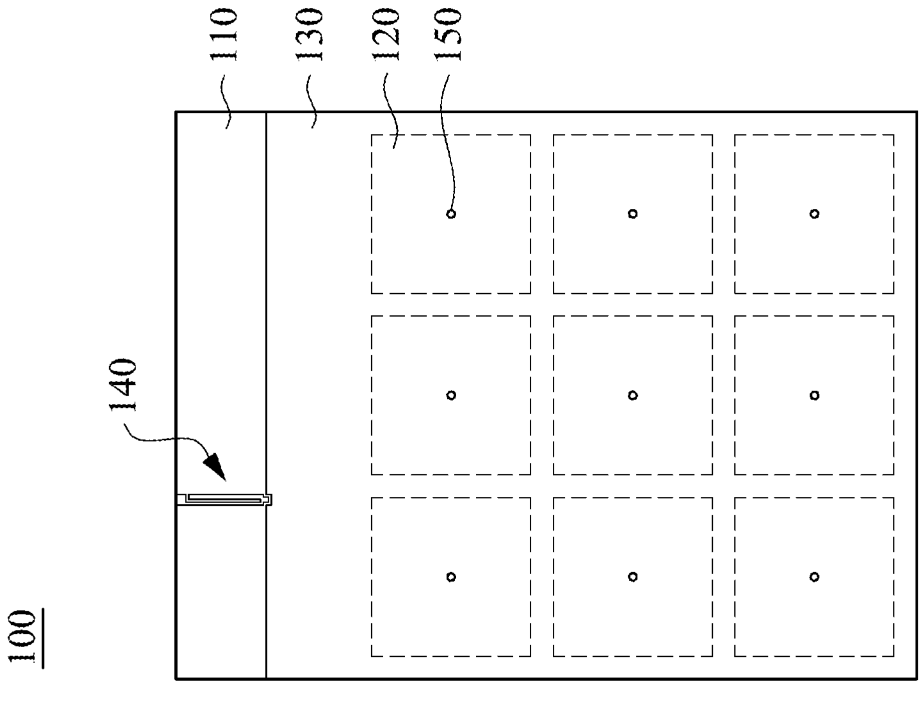
FIGS. 1A and 1B are top views respectively of the first surface and the second surface of the antenna structure in accordance to one embodiment of the disclosure.
Figure 1A:
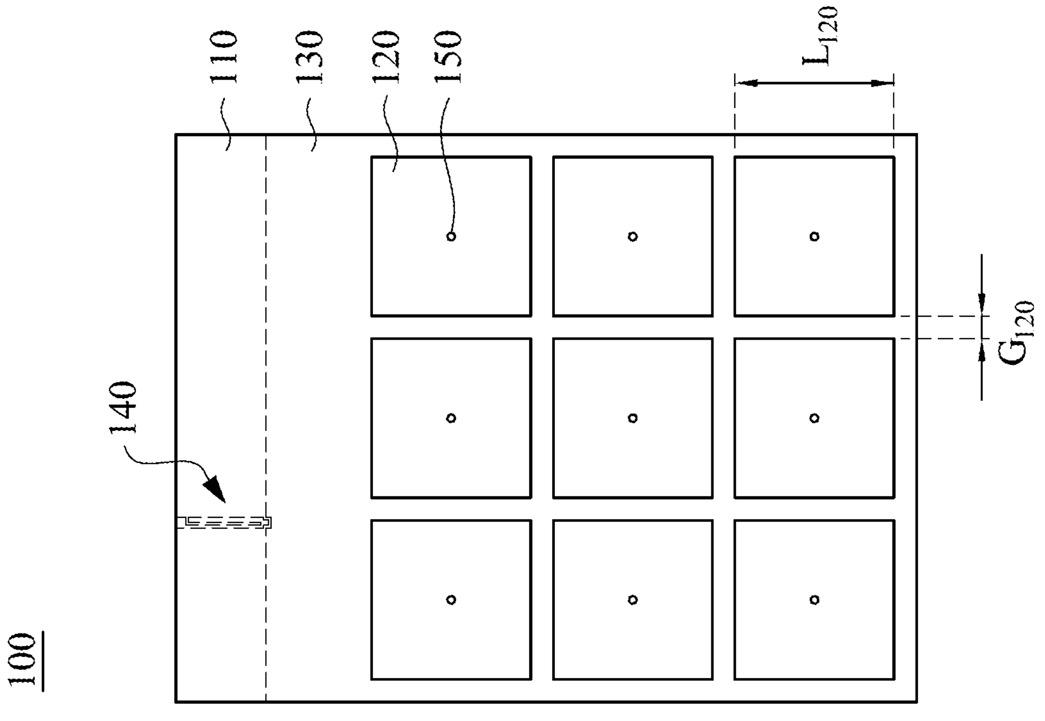

FIGS. 1A and 1B are top views respectively of the first surface and the second surface of an antenna structure 100 in accordance with one embodiment of the disclosure. The antenna structure 100 includes a substrate 110, reflective plates 120, a grounding plate 130, a radiating member 140 and conductive vias 150. The reflective plates 120 are on the first surface of the substrate 110, and the grounding plate 130 and the radiating member 140 are on the second surface of the substrate 110. The conductive vias 150 penetrate through the substrate 110 to respectively connect the reflective plates 120 to the grounding plate 130.

The substrate 110 contains liquid crystal polymer material, and the thickness of the substrate is ranged from about 100 μm to 400 μm. The reflective plates 120 are square patches arranged in an array of columns and rows on the first surface of the substrate 110. Each reflective plate 120 has a length $L_{120}$, and a gap $G_{120}$ is between two adjacent reflective plates 120. In other embodiments, the reflective plates 120 may be rectangular patches with different lengths and widths. FIGS. 1A and 1B are examples of 3×3 reflective plates 120, i.e., the reflective plates 120 are arranged in an array of three columns and three rows. In other embodiments, the antenna structure 100 may have reflective plates 120 of different numbers and different arrangements. The grounding plate 130 is a rectangular patch and overlaps with the reflective plates 120 in a normal direction of the substrate 110. Each reflective plate 120 may be electrically connected to the grounding plate 130 by the conductive vias 150 penetrating through the substrate 110. The material of the reflective plates 120 and the grounding plate 130 may be, for example, copper, silver, gold, platinum, nickel, tin, and/or alloy of above metals or other suitable materials.

The radiating member 140 is physically separated from the grounding plate 130 and does not overlap with the reflective plates 120. The material of the radiating member 140 may be the same as the reflective plates 120 and the grounding plates 130. The conductive vias 150 are respectively in the centers of the reflective plates 120. However, the positions of the conductive vias 150 may vary depending on the number of the reflective plates 120 and/or the size and pattern of the radiating member 140 and are not limited to shown in FIGS. 1A and 1B.

Figure 1C:
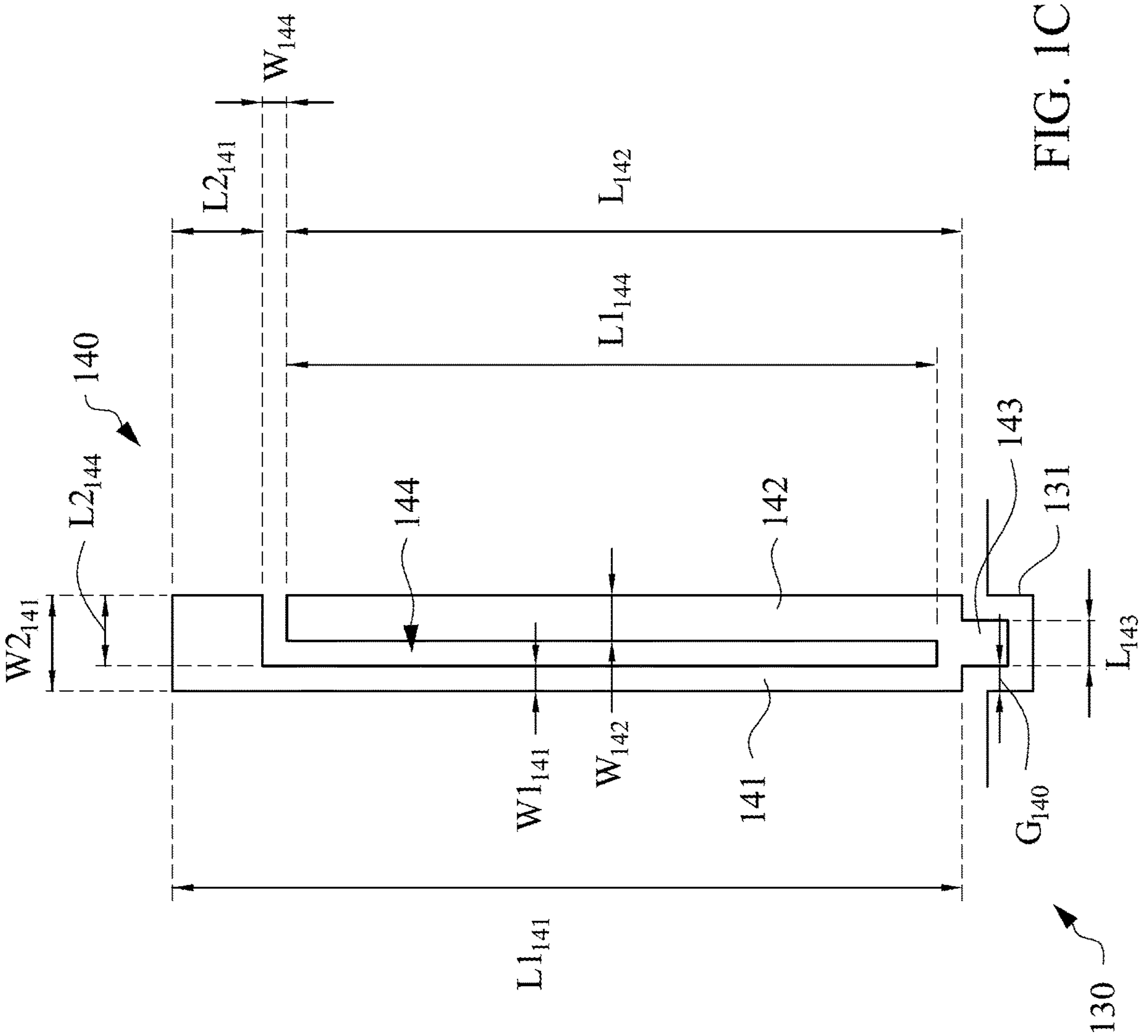
FIG. 1C is an enlarged top view of the radiating member shown in FIG. 1B.

FIG. 1C is an enlarged top view of the radiating member 140. As shown in FIG. 1C, the radiating member 140 is a monopole antenna, which includes two radiating branches 141, 142, a signal feeding terminal 143 and an open slot 144. The signal feeding terminal 143 is configured to couple with an external terminal, and the open slot 144 is defined by the radiating branches 141 and 142, so that the radiating member 140 may generate at least two different frequency bands. The grounding plate 130 further has an opening 131, the signal feeding terminal 143 is in the opening 131, and a gap $G_{140}$ is between the signal feeding terminal 143 and the grounding plate 130.

The radiating branch 141 has a strip section with a length $L1_{141}$ and a width $W1_{141}$ and a rectangular block section with a length $L2_{141}$ and a width $W2_{141}$. The radiating branch 142 has only one straight strip section, with a length $L_{142}$ and a width $W_{142}$. The signal feeding terminal 143 is square and has a length $L_{143}$. The open slot 144 is L-shaped and includes a first section with a length $L1_{144}$ and a width $W_{144}$ and a second section with a length $L2_{144}$ and a width $W_{144}$.

Figure 2A:
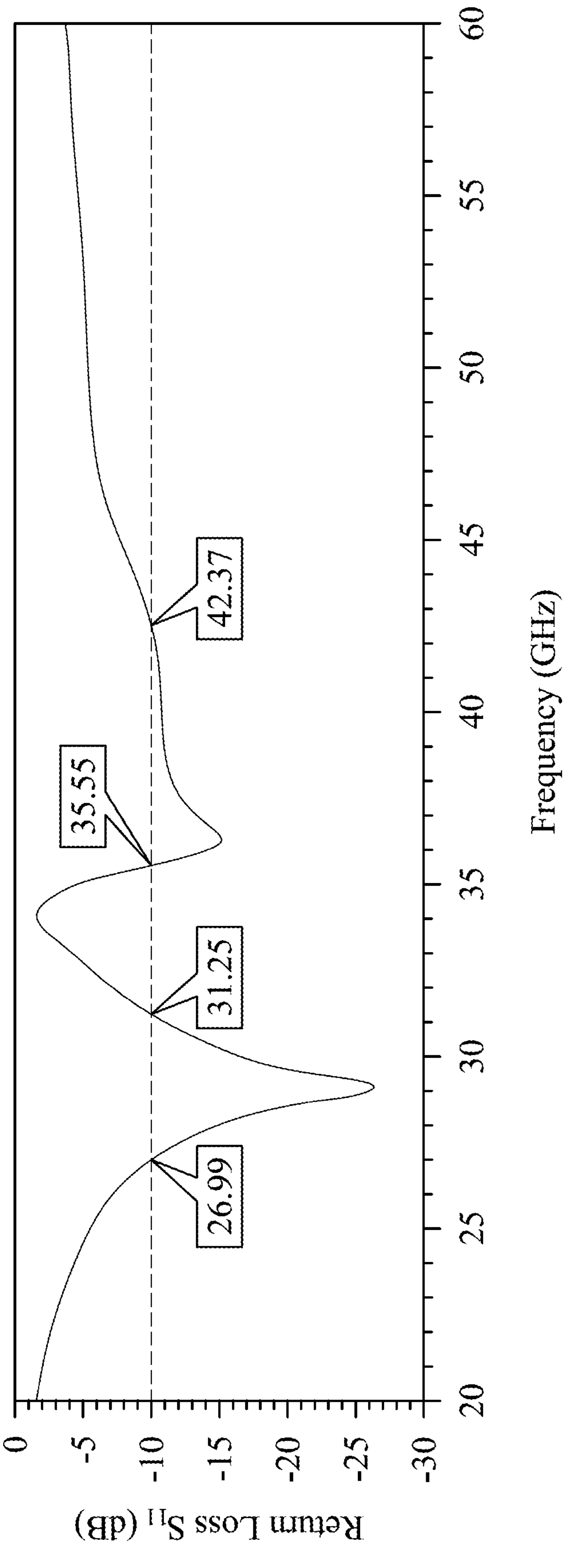
FIGS. 2A and 2B are return loss simulation results respectively of the antenna structure of the embodiment of the disclosure and an antenna structure of a comparative example.
Figure 2B:
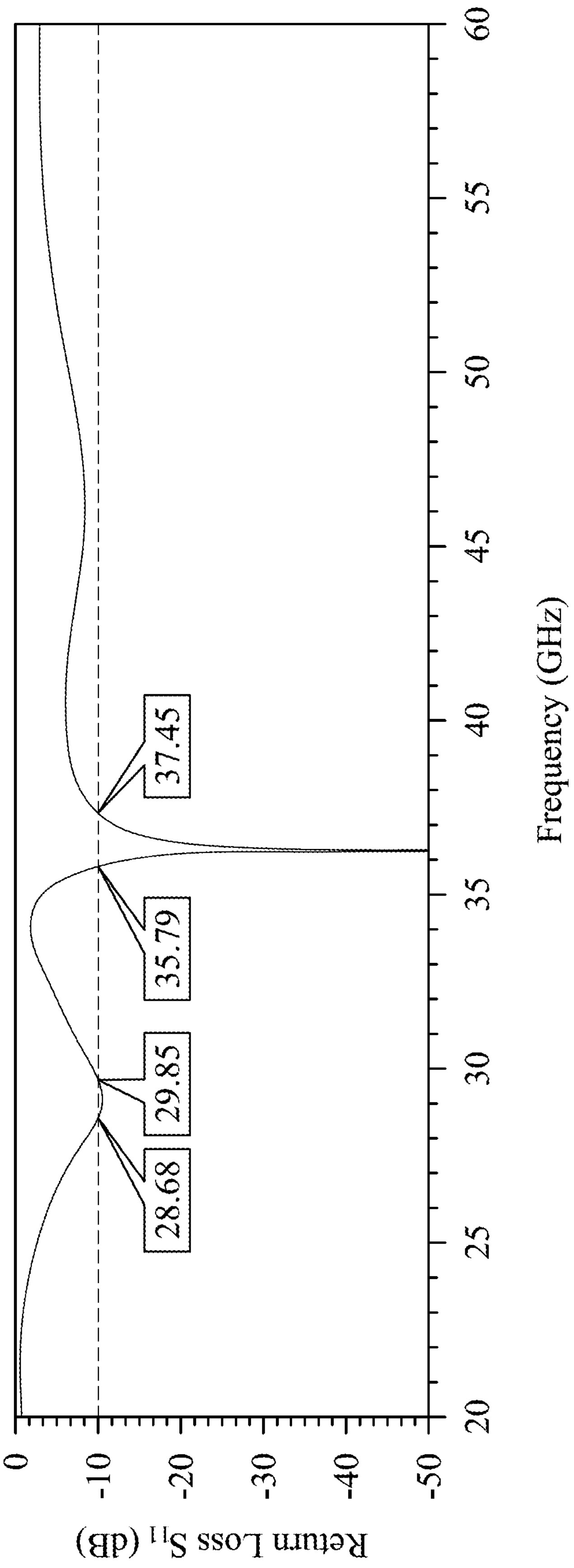

FIGS. 2A and 2B are return loss simulation results respectively of the antenna structure 100 of an embodiment according to the disclosure and an antenna structure of a comparative example. In this embodiment, the length $L_{120}$ of the reflective plates 120 is 2.5-3.5 mm, the lengths $L1_{141}$, $L2_{141}$ and the widths $W1_{141}$, $W2_{141}$ of the sections of the radiating branch 141 are 0.5-3.0 mm, 0.25-2.75 mm, 0.05-0.15 mm and 0.15-0.25 mm respectively. The length $L_{142}$ and the width $W_{142}$ of the radiating branch 142 are respectively 0.40-2.90 mm and 0.05-0.15 mm. The length $L1_{141}$ of the radiating branch 141 is ranged from $0.23\lambda_1$ to $0.25\lambda_1$, and the length $L_{142}$ of the radiating branch 142 is ranged from $0.23\lambda_2$ to $0.25\lambda_2$, where $\lambda_1$ and $\lambda_2$ are wavelengths of resonance frequencies respectively corresponding to two different operating frequency bands. The antenna structure of the comparative example is the same as the antenna structure 100 shown in FIGS. 1A and 1B without all reflective plates 120. As shown in FIGS. 2A and 2B, the frequency bands corresponding to the first operating frequency and the second operating frequency are respectively 28.68-29.85 GHz and 35.55-42.37 GHz, while those of the comparative example are 28.68-29.85 GHz and 35.79-37.45 GHz. In other words, the bandwidths of this embodiment according to the disclosure are larger by 3.03 GHz and 5.12 GHz. In addition, the antenna gains at the first and second operating frequencies of this embodiment according to the disclosure may reach 4.3 dB and 5 dB respectively, which are 2.6 dB and 2.3 dB higher than those of the comparative example. As a result, the antenna structure 100 of the embodiment according to the disclosure has a larger bandwidth and a higher antenna gain for both the lower and higher frequencies in comparison to the comparative example. The disclosure may effectively enlarge the bandwidth and the antenna gain for any operating frequencies.

Figure 3B:
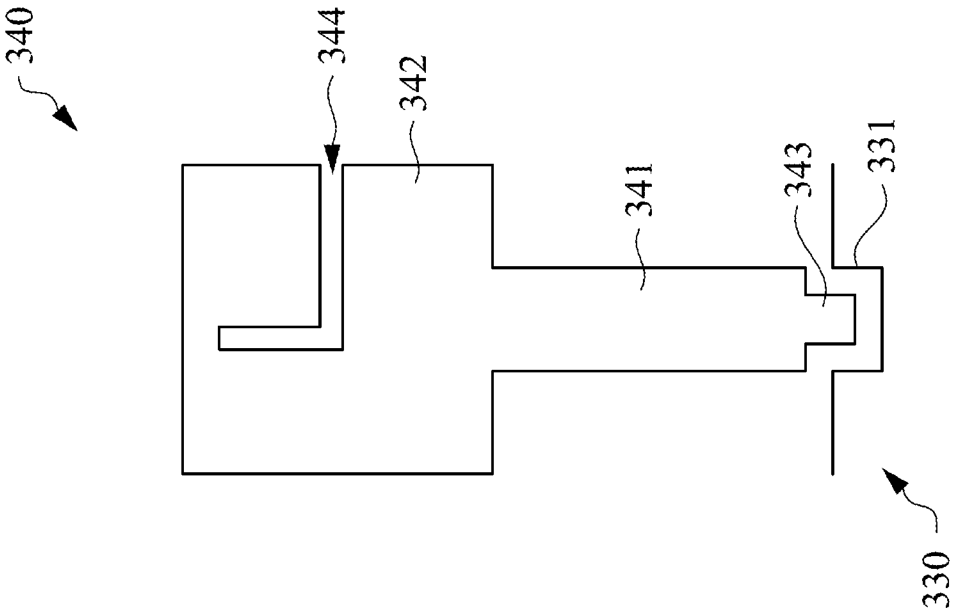
FIG. 3B is an enlarged top view of the radiating member shown in FIG. 3A.
Figure 3A:
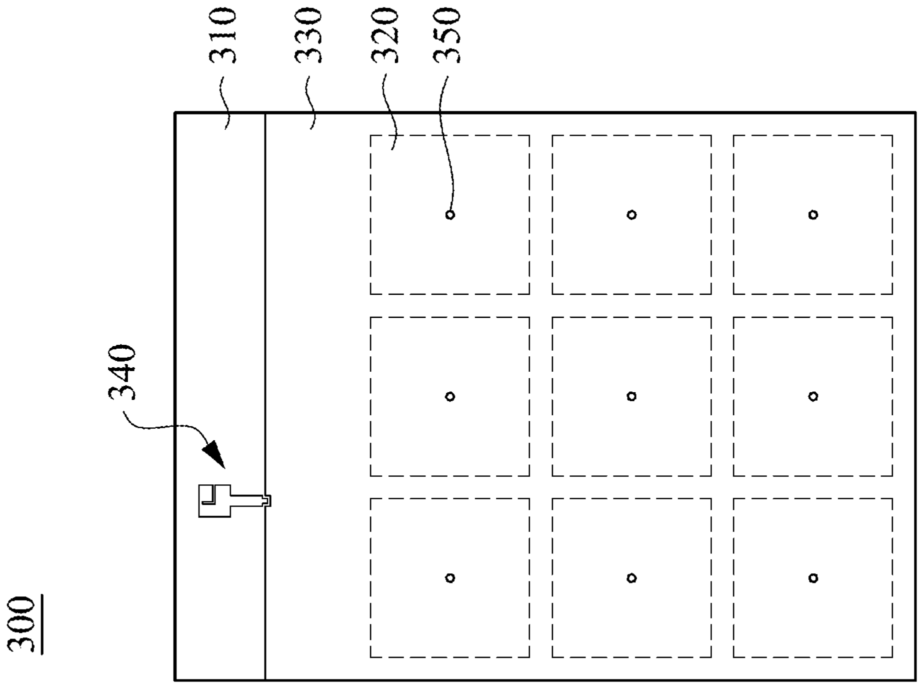
FIG. 3A is a top view of the second surface of the antenna structure according to one embodiment of the disclosure.

FIG. 3A is a top view of the second surface of the antenna structure 300 in accordance to another embodiment of the disclosure. As shown in FIG. 3A, the antenna structure 300 includes a substrate 310, reflective plates 320, a grounding plate 330, a radiating member 340 and conductive vias 350. The reflective plates 320 are on the first surface of the substrate 310. The grounding plate 330 and the radiating member 340 are on the second surface of the substrate 310, and are physically separated from each other. The conductive vias 350 penetrate through the substrate 310 to respectively connect the reflective plates 320 and the grounding plate 330. The difference between the antenna structure 300 (shown in FIG. 3A) and the antenna structure 100 (shown in FIGS. 1A and 1B) is shown in FIG. 3B. The radiating member 340 includes a signal feeding branch 341, a square radiating branch 342, a signal feeding terminal 343 and an L-shaped open slot 344. The two ends of the signal feeding branch 341 are respectively coupled to the radiating branch 342 and the signal feeding terminal 343, the signal feeding terminal 343 is in the opening 331 of the grounding plate 330 to couple with an external terminal, and the open slot 344 is defined by the radiating branch 342, so that the radiating member 340 is configured for generate two operating frequencies. In another embodiment, the radiative branch 342 may be rectangular with a different length and a different width. The substrate 310, the reflective plates 320, the grounding plate 330 and the conductive vias 350 are arranged similar to the substrate 110, the reflective plates 120, the grounding plate 130 and the conductive vias 150 of the antenna structure 100, thus the description of the antenna structure 100 may be referred to.

Figure 4B:
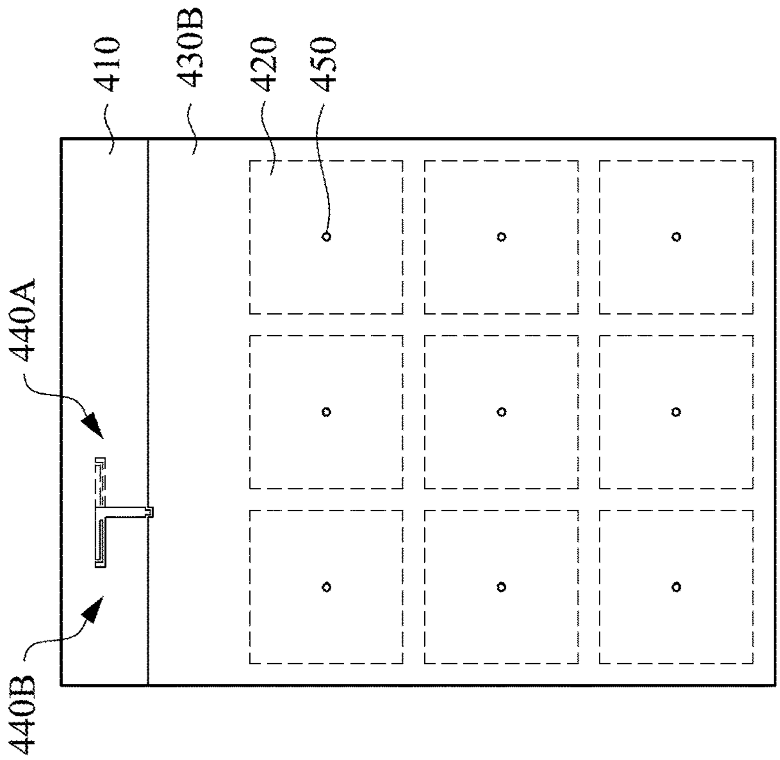
FIGS. 4A and 4B are top views respectively of the first surface and the second surface of the antenna structure according to one embodiment of the disclosure.
Figure 4A:
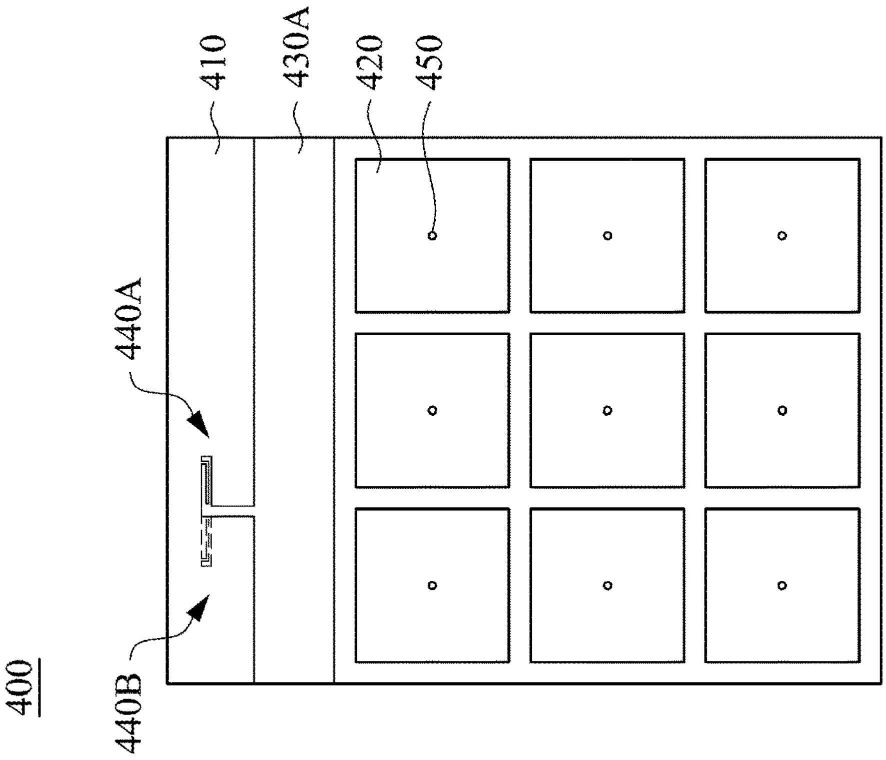
Figure 4D:
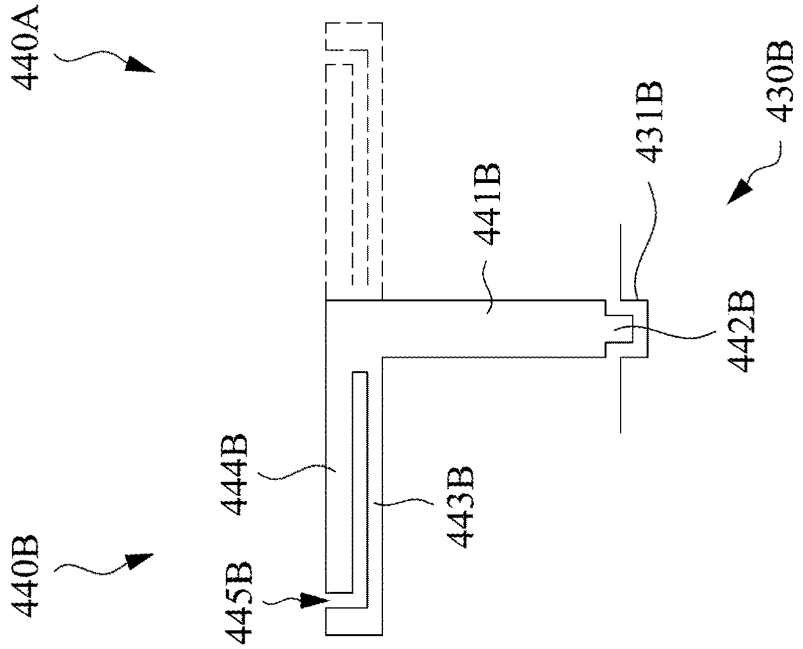
FIGS. 4C and 4D are respectively enlarged top views of the radiating member shown in FIGS. 4A and 4B.
Figure 4C:
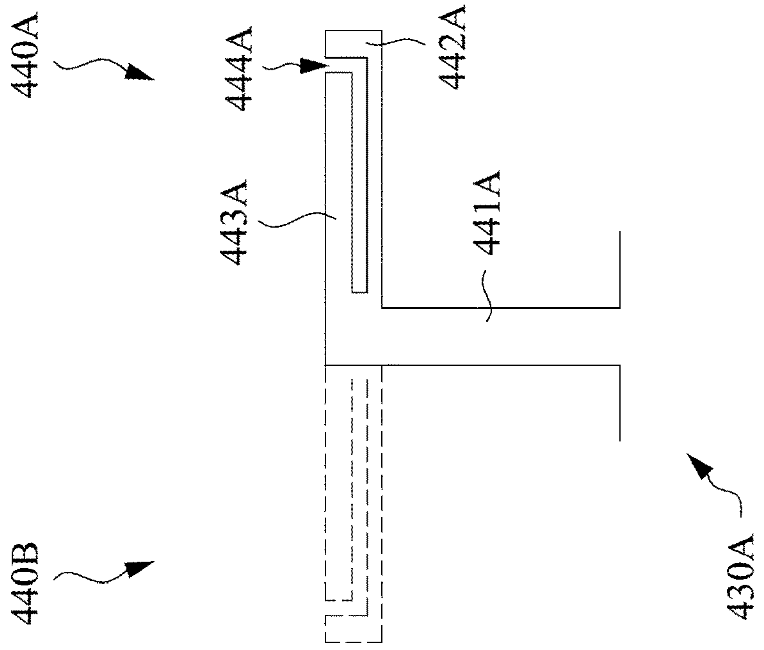

FIGS. 4A and 4B are respectively top views of the first surface and the second surface of an antenna structure 400 in accordance to another embodiment of the disclosure. As shown in FIGS. 4A and 4B, the antenna structure 400 includes a substrate 410, reflective plates 420, grounding plates 430A, 430B, radiating members 440A, 440B and conductive vias 450. The reflective plates 420, the grounding plate 430A and the radiating member 440A are on the first surface of the substrate 410 and are electrically connected to each other. The grounding plate 430B and the radiating member 440B are on the second surface of the substrate 410 and are physically separated. The grounding plates 430A and 430B are overlapped in the normal direction of the substrate 410, and the conductive vias 450 penetrate through the substrate 410 to respectively connect the reflective plates 420 and the grounding plate 430B. The difference between the antenna structure 400 (shown in FIGS. 4A and 4B) and the antenna structure 100 (shown in FIGS. 1A and 1B) is that the radiating members 440A and 440B constitute a dipole antenna. As further shown in FIGS. 4C and 4D, the radiating member 440A includes a strip grounding branch 441A, two radiating branches 442A, 443A and an L-shaped open slot 444A, and the radiating member 440B includes a strip signal feeding branch 441B, a signal feeding terminal 442B, two radiating branches 443B, 444B and an L-shaped open slot 445B. In the radiating member 440A, the two ends of the grounding branch 441A are respectively coupled to the grounding plate 430A and the radiating branches 442A and 443A. In the radiating member 440B, the two ends of the signal feeding branch 441B are respectively coupled to the signal feeding terminal 442B and the radiating branches 443B and 444B. The signal feeding terminal 442B is in the opening 431B of the grounding plate 430B for coupling with an external terminal. The open slot 444A is defined by the radiating branches 442A and 443A, and the open slot 445B is defined by the radiating branches 443B and 444B, such that the radiating members 440A and 440B may generate two operating frequencies. In addition, the grounding branch 441A and the signal feeding branch 441B may be overlapped in the normal direction of the substrate 410. The grounding plates 430A and 430B may be electrically connected with each other via an extra conductive via (not shown) that penetrates through the substrate 410. The substrate 410, the reflective plates 420, the grounding plate 430B and the conductive vias 450 are respectively similar to the substrate 110, the reflective plates 120, the grounding plate 130 and the conductive vias 150 of the antenna structure 100, and thus the description of the antenna structure 100 may be referred to.

Figure 5A:
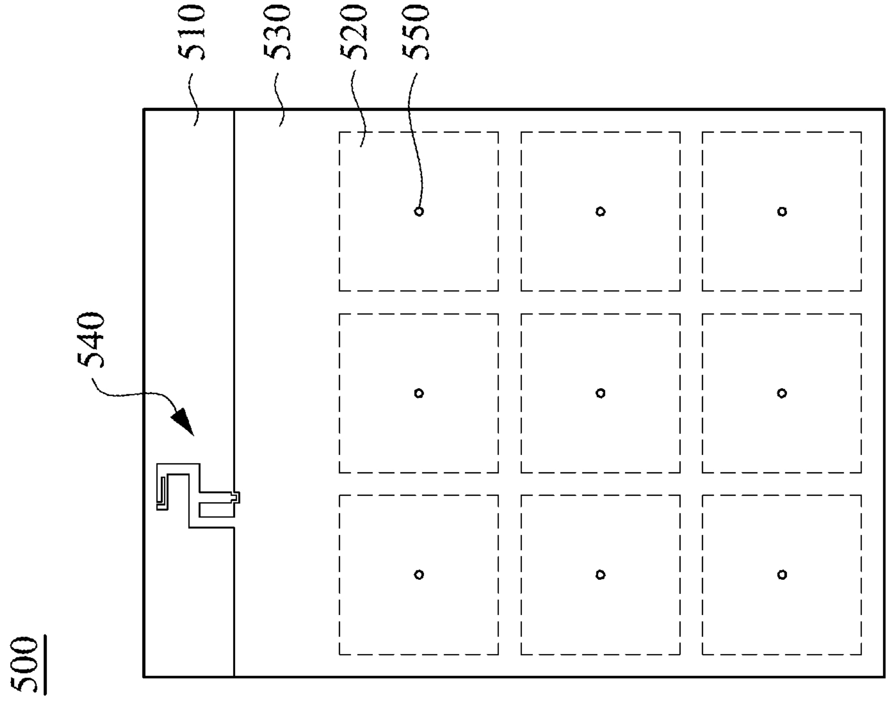
FIG. 5A is a top view of the second surface of the antenna structure according to one embodiment of the disclosure.
Figure 5B:
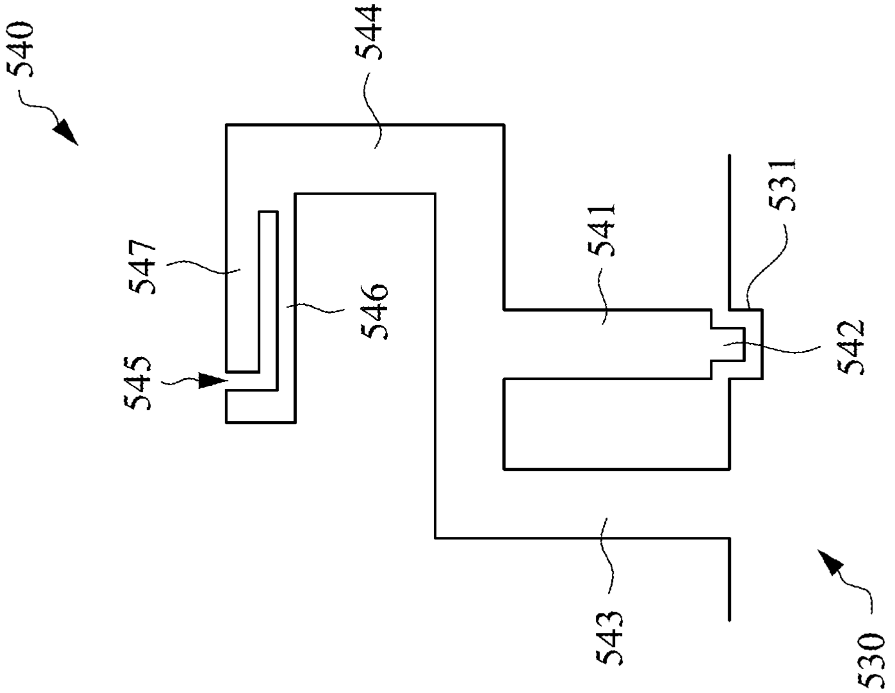
FIG. 5B is an enlarged top view of the radiating member shown in FIG.

FIG. 5A is a top view of the second surface of an antenna structure 500 in accordance to another embodiment of the disclosure. As shown in FIG. 5A, the antenna structure 500 includes a substrate 510, reflective plates 520, a grounding plate 530, a radiating member 540 and conductive vias 550. The reflective plates 520 are on the first surface of the substrate 510, and the grounding plate 530 and the radiating member 540 are on the second surface of the substrate 510. The conductive vias 550 penetrate through the substrate 510 to respectively connect the reflective plates 520 and the grounding plate 530. The difference between the antenna structure 500 (shown in FIG. 5A) and the antenna structure 100 (shown in FIGS. 1A and 1B) is that the radiating member 540 has a signal feeding branch 541, a signal feeding terminal 542, a grounding branch 543, a radiating branch 544 and an L-shaped open slot 545. One end of the signal feeding branch 541 and one end of the grounding branch 543 are coupled to the radiating branch 544. The other end of the signal feeding branch 541 is coupled to the signal feeding terminal 542, and the other end of the grounding branch 543 is coupled to the grounding plate 530. The signal feeding terminal 542 is in an opening 531 of the grounding plate 530 for coupling with an external terminal, the radiating terminal of the radiating branch 544 is formed of two radiating branches 546, 547 which define the open slot 545, such that the radiating member 540 can be configured for generate two operating frequencies. The substrate 510, the reflective plates 520, the grounding plate 530 and the conductive vias 550 are similar to the substrate 110, the reflective plates 120, the grounding plate 130 and the conductive vias 150 of the antenna structure 100, and thus the description of the antenna structure 100 may be referred to.

Figure 6:
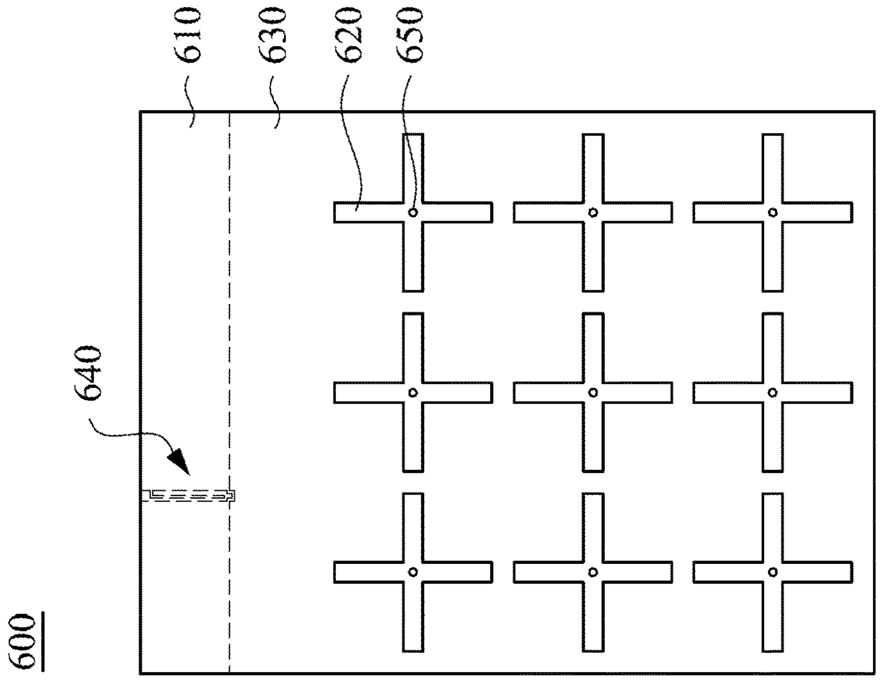
FIG. 6 is a top view of the first surface of the antenna structure according to one embodiment of the disclosure.

FIG. 6 is a top view of a first surface of an antenna structure 600 in accordance to another embodiment of the disclosure. The antenna structure 600 shown in FIG. 6 includes a substrate 610, reflective plates 620, a grounding plate 630, a radiating member 640 and conductive vias 650. The reflective plates 620 are on the first surface of the substrate 610, and the grounding plate 630 and the radiating member 640 are on the second surface of the substrate 610 and are physically separated. The conductive vias 650 penetrate through the substrate 610 to respectively connect the reflective plates 620 and the grounding plate 630. The difference between the antenna structure 600 (shown in FIG. 6) and the antenna structure 100 (shown in FIGS. 1A and 1B) is that each reflective plate 620 is shaped in a cross. The substrate 610, the grounding plate 630, the radiating member 640 and the conductive vias 650 are similar to the substrate 110, the grounding plate 130, the radiating member 140 and the conductive vias 150 of the antenna structure 100, and thus the description of the antenna structure 100 may be referred to.

Figure 7:
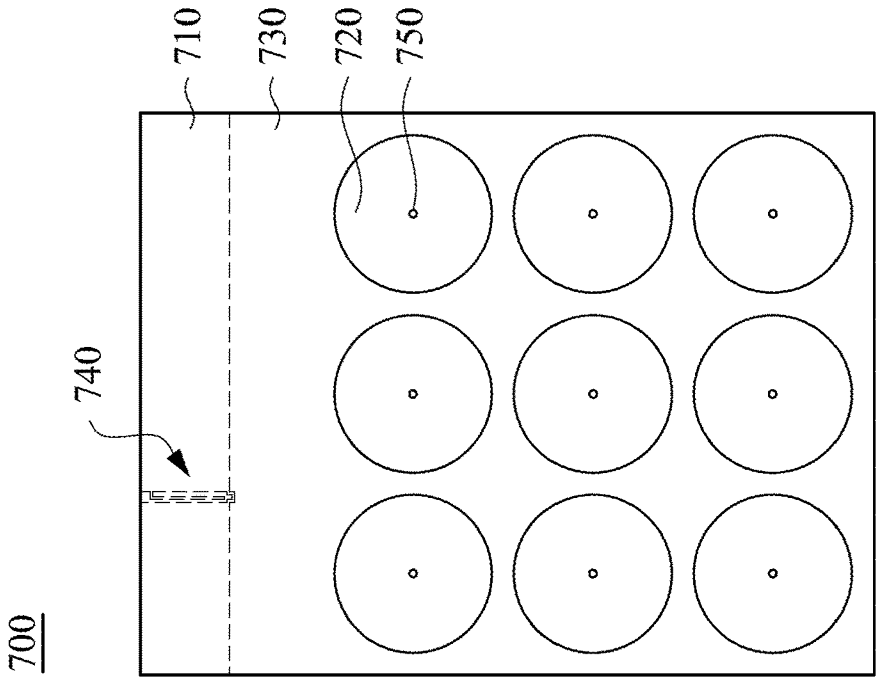
FIG. 7 is a top view of the first surface of the antenna structure according to one embodiment of the disclosure.

FIG. 7 is a top view of the first surface of an antenna structure 700 in accordance to another embodiment of the disclosure. As shown in FIG. 7, the antenna structure 700 includes a substrate 710, reflective plates 720, a grounding plate 730, a radiating member 740 and conductive vias 750. The reflective plates 720 are on the first surface of the substrate 710, and the grounding plate 730 and the radiating member 740 are on the second surface of the substrate 710 and are physically separated. The conductive vias 750 penetrates through the substrate 710 to respectively connect the reflective plates 720 and the grounding plate 730. The difference between the antenna structure 700 (shown in FIG. 7) and the antenna structure 100 (shown in FIGS. 1A and 1B) is that each reflective plate 720 is shaped in a circle. The substrate 710, the grounding plate 730, the radiating member 740 and the conductive vias 750 are similar to the substrate 110, the grounding plate 130, the radiating member 140 and the conductive vias 150 of the antenna structure 100, and thus the description of the antenna structure 100 may be referred to.

Figure 8:
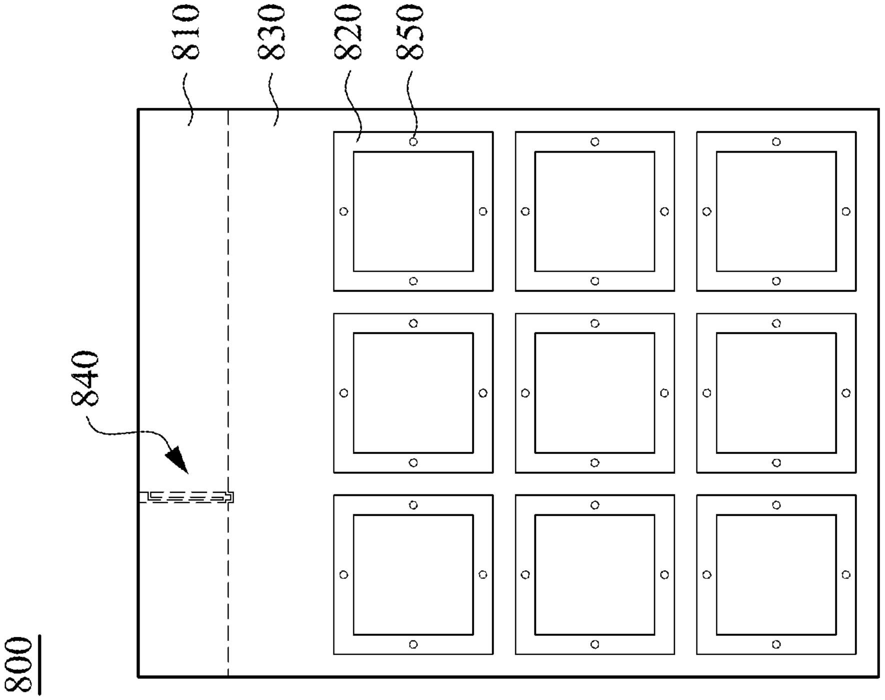
FIG. 8 is a top view of the first surface of an antenna structure according to one embodiment of the disclosure.

FIG. 8 is a top view of the first surface of an antenna structure 800 in accordance to another embodiment of the disclosure. The antenna structure 800 shown in FIG. 8 includes a substrate 810, reflective plates 820, a grounding plate 830, a radiating member 840 and conductive vias 850. The reflective plates 820 are on the first surface of the substrate 810, and the grounding plate 830 and the radiating member 840 are on the second surface of the substrate 810 and are physically separated. The conductive vias 850 penetrate through the substrate 810 to respectively connect the reflective plates 820 and the grounding plate 830. The difference between the antenna structure 800 (shown in FIG. 8) and the antenna structure 100 (shown in FIGS. 1A and 1B) is that the reflective plates 820 are rectangular frames arranged corresponding to the conductive vias 850. The substrate 810, the grounding plate 830 and the radiating member 840 are similar to the substrate 110, the grounding plate 130 and the radiating member 140 of the antenna structure 100, and thus the description of the antenna structure 100 may be referred to.

Figure 9A:
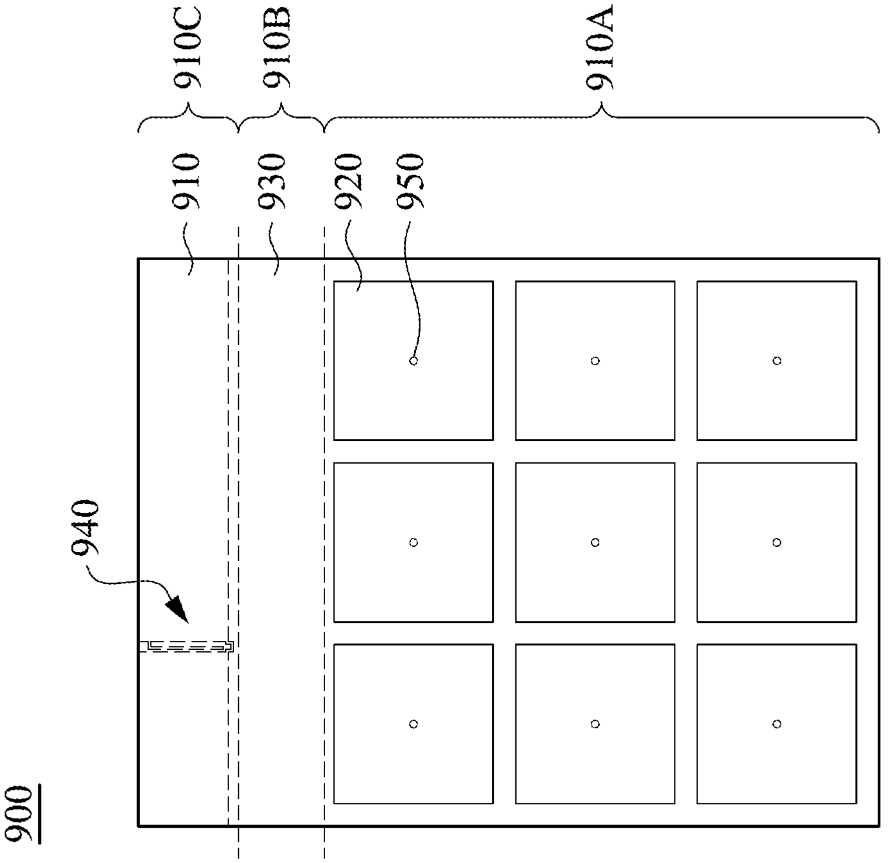
FIG. 9A is a top view of the first surface of an antenna structure according to another embodiment of the disclosure.

FIG. 9A is a top view of the first surface of an antenna structure 900 in accordance to another further embodiment of the disclosure. The antenna structure 900 includes a substrate 910, reflective plates 920, the grounding plate 930, the radiating member 940 and conductive vias 950. In comparison to the substrate 110 of the antenna structure 100, the substrate 910 is bendable and includes a planar portion 910A, a bendable portion 910B and a protruded portion 910C. The reflective plates 920, the grounding plate 930, the radiating member 940 and the conductive vias 950 may be similar to the reflective plates 120, the grounding plate 130, the radiating member 140 and the conductive vias 150 of the antenna structure 100.

Figure 9B:
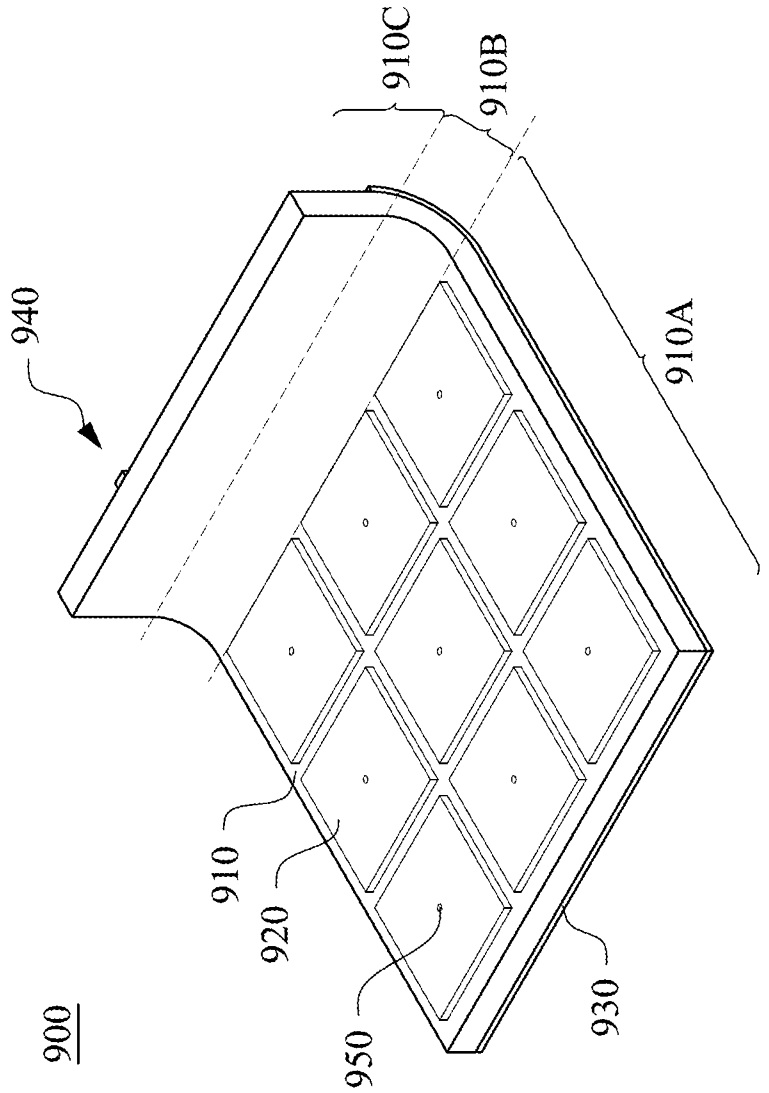
FIGS. 9B and 9C are respectively the stereoscopic view and the side view of the antenna structure in FIG. 9A after being bent.
Figure 9C:
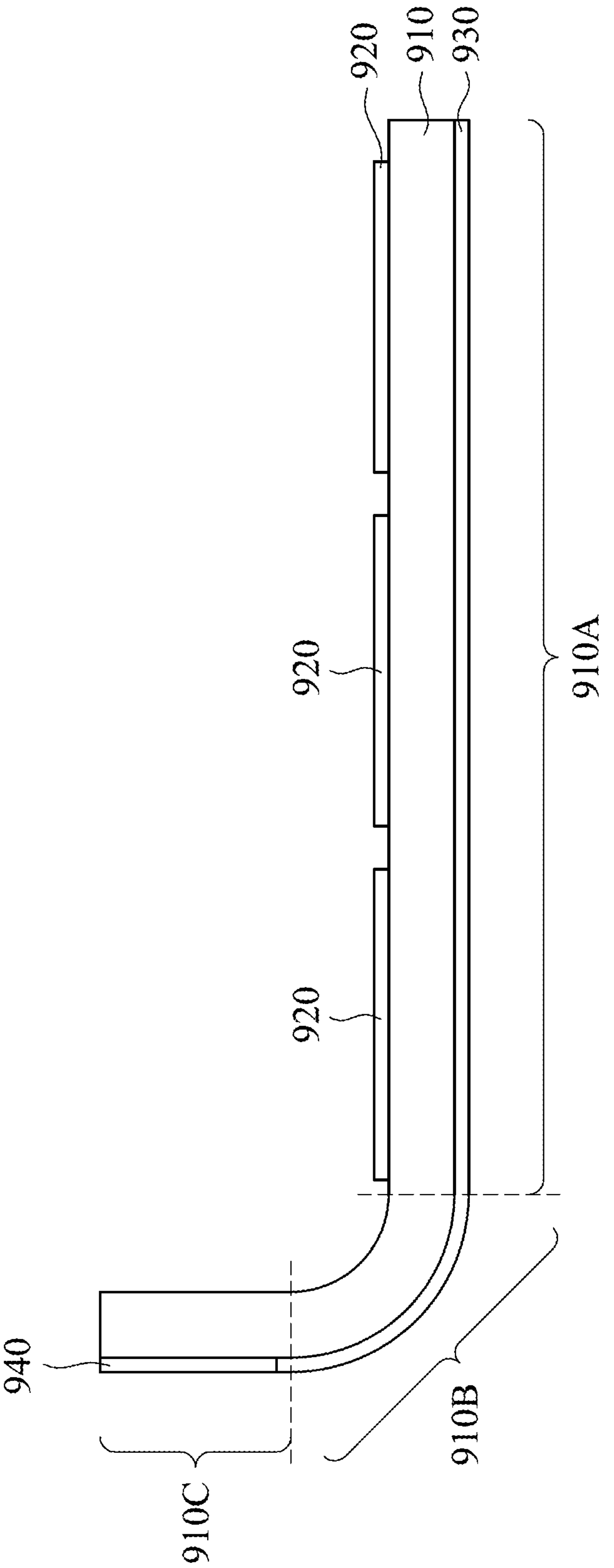

FIGS. 9B and 9C are a stereoscopic view and a side view of the antenna structure 900 after being bent. As shown in FIGS. 9B and 9C, the planar portion 910A is approximately perpendicular to the protruded portion 910C. The reflective plates 920 are arranged in the planar portion 910A in this embodiment, but may also extend from the planar portion 910A to the protruded portion 910C through the bendable portion 910B in other embodiments. The grounding plate 930 and the conductive vias 950 are in the planar portion 910A, and the radiating member 940 is in the protruded portion 910C.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims.

What is claimed is:

1. An antenna structure comprising:

a substrate having opposite first surface and second surface, and comprising liquid crystal polymer material;

a plurality of reflective plates arranged in an array on the first surface of the substrate;

a first grounding plate arranged on the second surface of the substrate and overlapped with the reflective plates in the normal direction of the substrate;

a first radiating member arranged on the second surface of the substrate and not overlapped with the reflective plates in the normal direction of the substrate, the first radiating member having an open slot defined by a first radiating branch and a second radiating branch, and generates at least two different operating frequency bands, wherein a length of the first radiating branch is from $0.23\lambda_1$ to $0.25\lambda_1$, and a length of the second radiating branch is from $0.23\lambda_2$ to $0.25\lambda_2$, where $\lambda_1$ and $\lambda_2$ are wavelengths of a first resonance frequency and a second resonance frequency respectively corresponding to the two operating frequency bands; and a plurality of conductive vias penetrating through the substrate and respectively connecting the reflective plates on the first surface and the first grounding plate on the second surface of the substrate.

2. The antenna structure of claim 1, wherein the first grounding plate defines an opening, and a signal feeding terminal of the first radiating member is located in the opening.

3. The antenna structure of claim 1, wherein the substrate has a planar portion and a protrusive portion substantially perpendicular to each other, and the reflective plates and the first radiating member are respectively arranged in the planar portion and the protrusive portion.

4. The antenna structure of claim 1, wherein the open slot is L-shaped.

5. The antenna structure of claim 1, wherein the first radiating member comprises:

a signal feeding terminal configured to couple to an external terminal;

a signal feeding branch coupled to the signal feeding terminal; and at least two radiating branches coupled to the signal feeding branch and define the open slot.

6. The antenna structure of claim 5, wherein the radiating branches are square-shaped or rectangular-shaped.

7. The antenna structure of claim 1 further comprising:

a second grounding plate on the first surface of the substrate and electrically connected to the first grounding plate; and a second radiating member on the first surface of the substrate and coupled to the second grounding plate, wherein the second radiating member and the first radiating member constitute a dipole antenna.

8. The antenna structure of claim 7, wherein a signal feeding branch of the first radiating member and a signal feeding branch of the second radiating member overlap in the normal direction of the substrate.

9. The antenna structure of claim 8, wherein the second radiating member comprises:

a signal feeding terminal configured to couple to an external terminal;

a signal feeding branch coupled to the signal feeding terminal; and at least two radiating branches coupled to the signal feeding branch and define the open slot.

10. The antenna structure of claim 9, wherein the second radiating member further comprising a grounding branch coupled to the second grounding plate.

11. The antenna structure of claim 1, wherein the first radiating member comprises:

a signal feeding terminal configured to couple to an external terminal;

a signal feeding branch coupled to the signal feeding terminal;

a grounding branch coupled to the first grounding plate; and at least two radiating branches coupled to the signal feeding branch and the grounding branch and define the open slot.

12. The antenna structure of claim 1, wherein the reflective plates are rectangular-shaped, cross-shaped or circular-shaped.

* * * * *